United States Patent
Dong et al.

(10) Patent No.: US 9,887,999 B2
(45) Date of Patent: Feb. 6, 2018

(54) LOGIN METHOD AND APPARATUS

(71) Applicant: NETEASE INFORMATION TECHNOLOGY(BEIJING) CO., LTD., Beijing (CN)

(72) Inventors: Haijiang Dong, Beijing (CN); Kun Cui, Beijing (CN)

(73) Assignee: NETEASE INFORMATION TECHNOLOGY(BEIJING) CO., LTD., Beijing (CN)

( * ) Notice: Subject to any disclaimer, the term of this patent is extended or adjusted under 35 U.S.C. 154(b) by 173 days.

(21) Appl. No.: 14/720,576

(22) Filed: May 22, 2015

(65) Prior Publication Data
US 2015/0341356 A1 Nov. 26, 2015

(30) Foreign Application Priority Data
May 26, 2014 (CN) .......................... 2014 1 0225462

(51) Int. Cl.
G06F 7/04 (2006.01)
H04L 29/06 (2006.01)
G06F 21/36 (2013.01)

(52) U.S. Cl.
CPC .......... *H04L 63/0884* (2013.01); *G06F 21/36* (2013.01); *G06F 2221/2115* (2013.01)

(58) Field of Classification Search
CPC . H04L 63/0884; G06F 21/36; G06F 221/2115
See application file for complete search history.

(56) References Cited

U.S. PATENT DOCUMENTS

| 2014/0033286 A1* | 1/2014 | Zhang | H04L 63/083 726/7 |
| 2014/0282961 A1* | 9/2014 | Dorfman | H04L 63/0823 726/7 |
| 2015/0220718 A1* | 8/2015 | Hong | H04L 63/0807 726/9 |

FOREIGN PATENT DOCUMENTS

| CN | 102238007 A | 11/2011 |
| CN | 102868670 A | 1/2013 |
| CN | 103001974 A | 3/2013 |
| CN | 103609090 A | 2/2014 |

* cited by examiner

Primary Examiner — Khoi Le
(74) Attorney, Agent, or Firm — Maschoff Brennan

(57) ABSTRACT

A login method and a login apparatus are provided. A third party server receives a login request of a first client and returns an identification code, the first client displays the identification code, and the third party server receives an authentication request of a second client to obtain a user unique identifier of the second client, wherein, the authentication request is sent by the second client according to an address of the third party server contained in the identification code after performing image acquisition to the identification code, and the third party server performs login authentication to corresponding third party account information bound to the user unique identifier and returns a login authentication result. The third party account information bound to the user unique identifier varies depending on the difference in the address information of the third party server contained in the identification code.

8 Claims, 6 Drawing Sheets

US 9,887,999 B2

LOGIN METHOD AND APPARATUS

CROSS-REFERENCE TO RELATED APPLICATIONS

This application claims the benefit and priority of Chinese patent application CN 201410225462.3 filed on May 26, 2014. The entire disclosure of the above application is incorporated herein by reference.

TECHNICAL FIELD

The embodiments of the present invention relate to the field of information technology, and more particularly, to a login method and apparatus.

BACKGROUND

This section is intended to provide the background or context for the embodiments of the present invention as recited in the claims. What is described herein is not admitted to be prior art by inclusion in this section.

A wide variety of web services have emerged with the rapid development of the Internet. For the reason of information security, many web services require user login, only after which may a user be able to use the corresponding services.

Among numerous login authentication methods, two-dimensional code (2-D code) login authentication has been used by many web service providers due to its advantages of easy operation and high security. Currently, the process of 2-D code login authentication is as follows: a user installs a client provided by a web service provider on a terminal such as a cell phone, and the user uses an account of the web service provider to login in the client; after the logged in user has scanned a 2-D code displayed on another terminal such as a computer by the client, the client interacts with a server of the web service provider, and the server enables the user to successfully login on the other terminal displaying the 2-D code with the same account according to the fact that the user logged in with the account in the client has scanned the 2-D code.

SUMMARY

However, according to the 2-D code login method in the prior art, the user is required to login with the account of the web service provider in the client provided by the web service provider to be able to log into the web service provider with the same account on the other terminal by way of scanning the 2-D code, thereby causing the user to install different clients for platforms of different web service providers, which leads to a waste of terminal resources.

Therefore, in the prior art, how can the login authentication be performed to save terminal resources is a very annoying issue.

For this reason, a great need exists for an improved login method to achieve the goal of saving terminal resources.

In this context, the embodiments of the present invention aim to provide a login method and apparatus.

In a first aspect of the embodiments of the invention, there is provided a login method applied to a third party server. The method, for example, may comprise: in response to receiving a login request sent by a user through a first client, returning an identification code to the first client so as to display the identification code on the first client, wherein, the identification code contains address information of the third party server; in response to receiving an authentication request sent by a second client, obtaining a user unique identifier of the second client, wherein, the authentication request is sent by the second client according to an address of the third party server after performing image acquisition to the identification code displayed on the first client and parsing the identification code to obtain the address information of the third party server; and performing login authentication to corresponding third party account information bound to the user unique identifier, and returning a login authentication result to the first client.

In a second aspect of the embodiments of the invention, there is provided a login apparatus configured on a third party server. The login apparatus, for example, may comprise: an identification code feedback unit, which may be configured to, in response to receiving a login request sent by a user through a first client, return an identification code to the first client so as to display the identification code on the first client, wherein, the identification code contains address information of the third party server; an identifier obtaining unit, which may be configured to, in response to receiving an authentication request sent by a second client, obtain a user unique identifier of the second client, wherein, the authentication request is sent by the second client according to an address of the third party server after performing image acquisition to the identification code displayed on the first client and parsing the identification code to obtain the address information of the third party server; and a login authentication unit, which may be configured to perform login authentication to corresponding third party account information bound to the user unique identifier, and return a login authentication result to the first client.

In a third aspect of the embodiments of the invention, there is provided a login method applied to a second client. The method, for example, may comprise: in response to an operation of scanning an identification code by a user, performing image acquisition to the identification code displayed on a first client; parsing the acquired identification code to obtain address information of a third party server contained in the identification code; and sending an authentication request to the third party server corresponding to the address information of the third party server, for the third party server to obtain a user unique identifier of the second client, perform login authentication to corresponding third party account information bound to the user unique identifier, and return a login authentication result to the first client.

In a fourth aspect of the embodiments of the invention, there is provided a login apparatus configured on a second client. The login apparatus, for example, may comprise: an acquisition unit, which may be configured to, in response to an operation of scanning an identification code by a user, perform image acquisition to the identification code displayed on a first client; a parsing unit, which may be configured to parse the acquired identification code to obtain address information of a third party server contained in the identification code; and an authentication requesting unit, which may be configured to send an authentication request to the third party server corresponding to the address information of the third party server, for the third party server to obtain a user unique identifier of the second client, perform login authentication to corresponding third party account information bound to the user unique identifier, and return a login authentication result to the first client.

In a fifth aspect of the embodiments of the invention, a system is provided, wherein the system for example can include one or more processing devices, and one or more machine-readable media configured to store instructions that are executable by the one or more processing devices to perform operations including in response to receiving a login request sent by a user through a first client, returning an identification code to the first client so as to display the identification code on the first client, wherein, the identification code contains address information of the third party server; in response to receiving an authentication request sent by a second client, obtaining a user unique identifier of the second client, wherein, the authentication request is sent by the second client according to an address of the third party server after performing image acquisition to the identification code displayed on the first client and parsing the identification code to obtain the address information of the third party server; and performing login authentication to corresponding third party account information bound to the user unique identifier, and returning a login authentication result to the first client.

In a sixth aspect of the embodiments of the invention, a system is provided, wherein the system for example can include one or more processing devices, and one or more machine-readable media configured to store instructions that are executable by the one or more processing devices to perform operations including in response to an operation of scanning an identification code by a user, performing image acquisition to the identification code displayed on a first client; parsing the acquired identification code to obtain address information of a third party server contained in the identification code; and sending an authentication request to the third party server corresponding to the address information of the third party server, for the third party server to obtain a user unique identifier of the second client, perform login authentication to corresponding third party account information bound to the user unique identifier, and return a login authentication result to the first client.

With the login method, apparatus, system in accordance with the invention, the third party account information bound to the user unique identifier of the second client may vary depending on the difference in the address information of the third party server contained in the identification code; hence, the user may install only one client for platforms of different web service providers to be able to login with the identity of a third party account on the different platforms by way of scanning the identification code, thereby achieving the goal of saving terminal resources.

BRIEF DESCRIPTION OF THE DRAWINGS

The above and other objectives, features and advantages of exemplary embodiments of the invention will become more readily understandable by reading the following detailed description with reference to the accompanying drawings. A number of embodiments of the invention are shown in an exemplary and unrestrictive manner in the drawings, of which.

In the drawings, identical or corresponding numerals denote identical or corresponding parts.

DETAILED DESCRIPTION OF THE INVENTION

Figure 1:
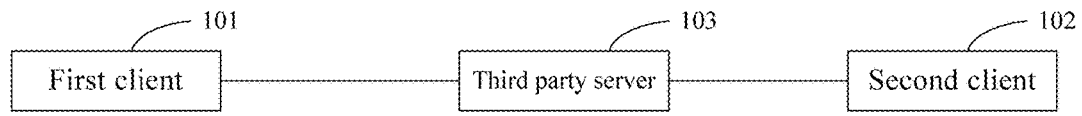
FIG. 1 schematically illustrates an application scenario in which the embodiments of the invention may be implemented.

The principles and spirit of the present invention will be described below with reference to a number of exemplary embodiments. It should be understood that, those embodiments are given merely for those skilled in the art to better understand and thus implement the invention, and do not limit the scope of the invention in any way. On the contrary, those embodiments are provided to make the disclosure more thorough and complete, so that the scope of the disclosure may be completely conveyed to those skilled in the art.

It is known to those skilled in the art that, the embodiments of the invention may be implemented as a system, apparatus, device, method or computer program product. Thus, the present disclosure may be specifically implemented in the form of complete hardware, complete software (including firmware, resident software, microcode, etc.), or combinations of hardware and software.

A login method and apparatus are proposed in accordance with the embodiments of the invention.

It is to be understood that the term "identification code" herein may refer to a graphical identification code that encodes information in a graphical manner, such as a 1-D code, 2-D code, or 3-D code, etc. Any number of elements in the drawings is intended to be illustrative rather than limiting, and any naming is used merely for distinguishing purpose without any meaning of limitation.

The principles and spirit of the present invention will be described in details below, with reference to a number of representative embodiments of the invention.

Briefing of the Invention

The inventors have found that, according to the 2-D code login method in the prior art, a user needs to install different clients correspondingly for platforms of different third party web service providers, which results in a waste of terminal resources.

To address this issue, the inventors have found that, address information of a third party server may be configured in an identification code, so that a client may, after scanning the identification code displayed on another client, parse the identification code to obtain the address information of the third party server, and send an authentication request according to the address information of the third party server. The inventors have also found that, third party account information bound to a user unique identifier of a second client may vary depending on the difference in the address information of the third party server contained in the identification code; hence, the user may install only one client for different web service providers to be able to login with the identity of a corresponding third party account on different platforms by scanning, in the client, the identification code displayed by other clients, thereby achieving the goal of saving terminal resources.

Having presented the basic principles of the present invention, various non-limiting embodiments of the invention will be described below with particularity.

Overview of Application Scenarios

First, referring to FIG. 1, a first client 101 may be a client application such as a web browser running on a terminal such as a desktop computer, tablet computer, smart mobile terminal, etc., and a second client 102 may be a client application such as an instant messaging client application (e.g., "Yixin", "Wechat", etc.) running on another smart mobile terminal. By applying the login method provided by the examples of the invention, a user may perform image acquisition to an identification code displayed on the first client 101 using the second client 102, and send an authentication request to a third party server 103 of a third party account according to for example the address of the third party server of the third party account contained in the identification code to cause the third party server 103 to obtain a user unique identifier of the second client from the second client 102 with the authentication request, perform login authentication to third party account information bound to the user unique identifier, and return a login authentication result to the first client 101 after the authentication is passed. In the case that the authentication result is "pass", the user may be enabled to successfully login with the identity of the third party account on the first client 101.

The First Exemplary Method

A login method according to the exemplary embodiment of the invention will be described below with reference to FIG. 2, in connection with the application scenario in FIG. 1. It should be noted that, the above application scenario is shown merely to facilitate the understanding of the spirit and principles of the invention, and there is no limitation to the embodiments of the invention in this respect. On the contrary, the embodiments of the invention may be applicable to any suitable scenario.

Figure 2:
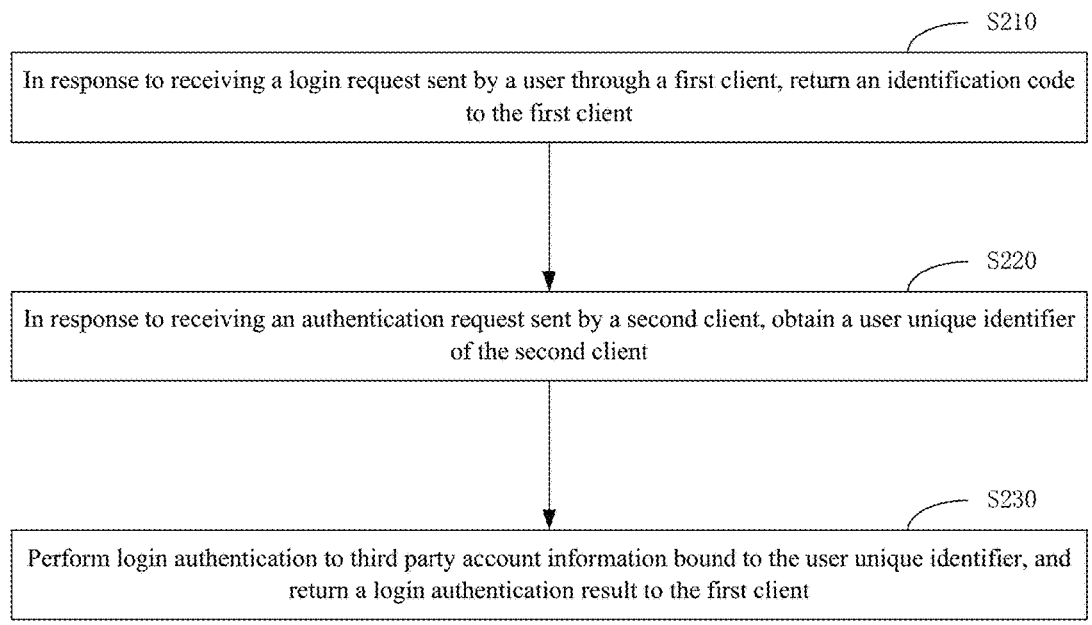
FIG. 2 schematically illustrates a flow diagram of a login method applied to a third party server, according to an embodiment of the invention.

For example, referring to FIG. 2, there is shown a flow diagram of a login method applied to a third party server provided by an embodiment of the invention. As shown, a possible embodiment of the invention may include:

S210: in response to receiving a login request sent by a user through a first client, returning an identification code to the first client so as to display the identification code on the first client, wherein, the identification code contains address information of the third party server.

For example, when the user performs a particular operation such as opening a particular link on the first client, the first client may send the login request to the third party server in response to the particular operation, the third party server invokes an identification code generation interface to generate an identification code containing address information of the third party server and returns the identification code to the first client, and the first client displays the identification code in a page for the user to perform image acquisition to the identification code using a second client. Wherein, the address information may point to a URL of a webpage provided by the third party server for login authentication.

S220: in response to receiving an authentication request sent by a second client, obtaining a user unique identifier of the second client, wherein, the authentication request is sent by the second client according to an address of the third party server after performing image acquisition to the identification code displayed on the first client and parsing the identification code to obtain the address information of the third party server.

It should be noted that the third party server may be in a connected state with the second client before the authentication request is sent, or it may also establish a connection with the second client according to the authentication request upon receiving the authentication request, and there is no limit to the specific way of establishing the connection.

Figure 5:
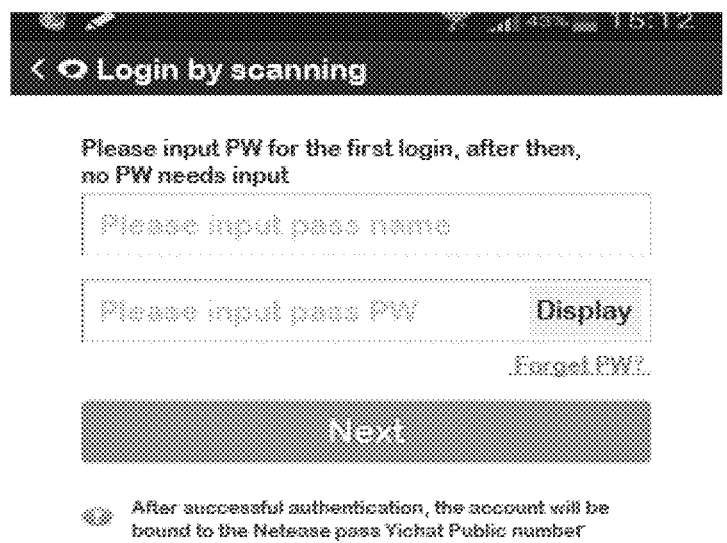
FIG. 5 schematically illustrates a schematic diagram of a third party verification page according to an embodiment of the invention.
Figure 5:
Figure 6:
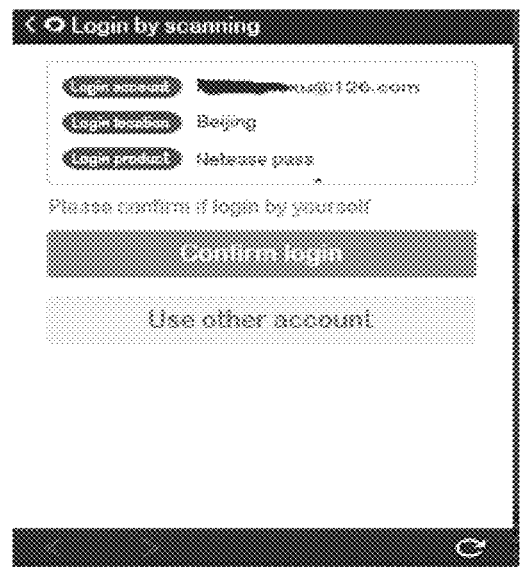
FIG. 6 schematically illustrates a schematic diagram of a confirmation page according to an embodiment of the invention.

Wherein, the address information of the third party server may be a URL of a webpage of the third party server for login authentication. For example, a page displayed by the webpage for login authentication may be the third party account verification page as shown in FIG. 5, or the login confirmation page as shown in FIG. 6; specifically, a corresponding page may be displayed according to the need of the actual authentication. For example, the second client may display a page where the URL points to in an embedded browser.

Wherein, the user unique identifier of the second client may be sent directly by the second client to the third party server in clear text form, or it may also be sent to the third party server in cipher text form.

In some possible implementations, the user unique identifier may be saved in the cookie of the second client for convenience. The cookie may be encrypted by the third party server. The third party server may authenticate whether a valid cookie containing the user unique identifier is obtained from the second client. If the obtained cookie is valid, the cookie may be decrypted to obtain the user unique identifier of the second client therefrom. Wherein, the timing of the generation of the cookie is not limited. For example, when the user logs into the third party server with an account identified by the user unique identifier on the second client, the third party server may generate a cookie containing at least the user unique identifier of the second client, and send the cookie to the second client after encryption. If the third party server does not obtain a valid cookie when obtaining the cookie (e.g., invalidation due to loss of data in the cookie), or does not obtain the cookie at all, it may obtain the user unique identifier of the second client by invoking a user information interface provided by a public platform corresponding to the second client, and then the third party server may further generate a cookie containing at least the user unique identifier of the second client and send the cookie to the second client after encryption. It should be noted that, the encryption algorithm specifically employed in the examples of the invention is not limited, for example, the AES algorithm may be employed.

It will be appreciated that the cookie containing the user unique identifier may be saved in an embedded browser of the second client. According to a session persistence mechanism, the embedded browser of the second client will always keep the cookie containing the user unique identifier during the time when the user logs into the second client. Once the user logs out from the second client, the cookie saved in the embedded browser is automatically deleted accordingly. Moreover, in the embodiments of encrypting the cookie by the third party server, there is no decryption algorithm for the encrypted cookie on the second client. Even if the second client is under malicious attack, the encrypted cookie will not be cracked, so that the information security of the user may be guaranteed.

S230: performing login authentication to corresponding third party account information bound to the user unique identifier, and returning a login authentication result to the first client.

It will be appreciated that the third party account information should at least comprise username information, and may also comprise information such as password, etc.

In some implementations, before performing login authentication to the third party account information bound to the user unique identifier, the following authentication steps may also be included:

Authentication step 1: authenticating whether a valid login token (usually a string) generated by the third party server is obtained from the second client.

The login token is used to indicate whether the status of the current third party account password-free login of the user is valid. For example, after the user inputs the third party account password for the first time, the third party server generates a login token, and the login token generated by the third party server may be saved in a cookie at the second client. At the time of subsequent login, the third party server will obtain the cookie from the second client, retrieve back this login token, and authenticate whether this login token is valid; if valid, it may be determined that the login authentication to the corresponding third party account information bound to the user unique identifier is passed so that the user needs not to input the third party account password again, thereby achieving password-free login. Furthermore, if a valid login token generated by the third party server is not obtained from the second client, the third party account password input by the user may be received through a third party account verification page displayed on the second client. More specifically, for example, the third party account information received through the third party account verification page may be divided into two cases of receiving only the third party account password or receiving the third party account name and password, according to the authentication results of the following authentication step 2 and authentication step 3; see the description of steps 2 and 3 below for details.

Wherein, the embodiments of authenticating whether the login token is valid may be designed according to the need of the actual application scenario. For example, it may be possible to judge whether the login token is valid by comparing it with a login token saved on the third party server side. For another example, it is possible to judge whether the login token is valid according to whether the login token has exceeded a valid duration. Wherein, the login token saved on the third party server side may be updated when the third party account password is changed, may be updated when the user performs a repair operation to the third party account information, may be set as invalid when the user turns off the 2-D code login function, and may be set to invalid when the user cancels the binding relationship, etc.

Since the login token is a string generated and encrypted by the third party server, there is no decryption algorithm on the client, and therefore the login token is not vulnerable to malicious theft. Even if someone else logs in by way of scanning the identification code fraudulently using the user information of the second client, he/she will not be able to pass the authentication in a password-free manner due to the absence of a valid login token, thereby ensuring the security of the third party account information.

Authentication step 2: if a valid login token generated by the third party server is not obtained from the second client, authenticating whether the user unique identifier is bound with the corresponding third party account information.

If the user unique identifier is not bound with the corresponding third party account information, the third party account name and password input by the user may be received through a third party account verification page displayed on the second client, and the third party server may bind the user unique identifier with the received third party account name, and perform login authentication to the received third party name and password.

Authentication step 3: if the user unique identifier is bound with the corresponding third party account information, authenticating whether the binding status of the binding between the user unique identifier and the third party account is valid.

For example, after the user unique identifier has been bound with the corresponding third party account information, if the user changes the third party account password or performs a repair operation to the third party account, it may lead to the login token being invalid while the binding status being valid. If a valid login token generated by the third party server is not obtained from the second client and the binding status is authenticated as valid, it is possible to only receive the third party account password input by the user through the third party account verification page displayed on the second client, and perform login authentication to the received password.

For another example, after the user unique identifier has been bound with the corresponding third party account information, if the user turns off the 2-D code login function, it may lead to the binding status being invalid. If a valid login token generated by the third party server is not obtained from the second client and the binding status is authenticated as invalid, it is possible to receive the third party account name and password input by the user through the third party account verification page displayed on the second client, bind the received third party account name, and perform login authentication to the password.

Furthermore, in the above authentication steps, after receiving the third party account information through the third party account verification page displayed on the second client, it is possible to further generate an updated login token, and send it to and save it on the second client, for the user to login without inputting the password by way of scanning a 2-D code the next time.

After performing login authentication to the third party account information bound to the user unique identifier, if the login authentication to the third party account information is passed, it may also be possible to return a login authentication pass massage to the second client, for the second client to display a login confirmation page to the user; if a login confirmation operation input by the user is received through the second client, cause the first client to enter into a page corresponding to a successful login. Wherein, information such as login location, login time, and login product of the current login of the user may be displayed in the login confirmation page displayed to the user, for the user to confirm the relevant information of the current login, in order to prevent logging into an illegal platform by scanning an unknown 2-D code.

Regarding the first client, while displaying the identification code returned by the third party server, page polling may be performed through a page displayed when the third party server returns the identification code, thereby obtaining the returned login authentication result by polling the third party server through periodic short connections with the third party server; or, obtaining the returned login authentication result in time through a long connection with the third party server when the login authentication result comes out on the third party server. After passing the login authentication, the first client may set the corresponding information according to the need of service to display a user login result and enter into a related function page.

In addition, the user may make a setting in the second client or the third party server as to whether to allow login by scanning the identification code; when the setting is "allowed", the second client receives an operation of scanning the identification code by the user and interacts with the third party server to perform login authentication of the third party account; when the setting is "not allowed", the second client or the third party server prohibits the login authentication of the third party account by scanning the identification code, thereby increasing the security of such login approach.

By applying the method provided by the embodiments of the invention, the third party account information bound to the user unique identifier may vary depending on the difference in the address information of the third party server contained in the identification code; hence, the user may install only one client for platforms of different web service providers to be able to login with the identity of a corresponding third party account on the different platforms by scanning the identification code displayed by other clients on the client, thereby achieving the goal of saving terminal resources.

Figure 3:
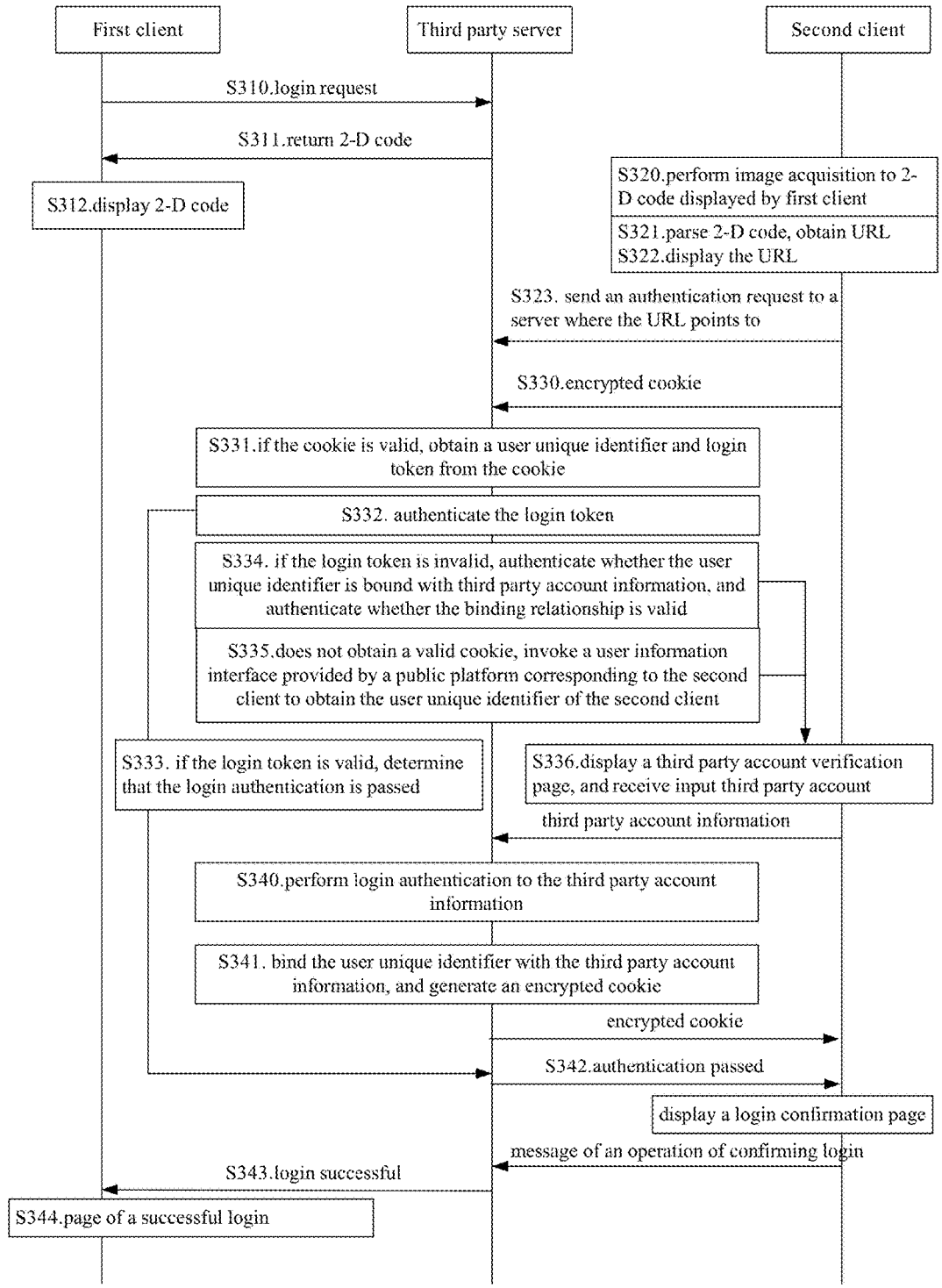
FIG. 3 schematically illustrates a signaling diagram according to an embodiment of the invention.

In order to make the embodiments of the invention more readily understood, an embodiment of the invention will be described in details below with reference to the signaling diagram shown in FIG. 3. As shown, the embodiment may comprise:

S310: a user sends a login request to a third party server through a first client.

S311: the third party server returns a 2-D code to the first client, wherein, the 2-D code contains a URL of a webpage provided by the third party server for user login authentication.

Figure 4:
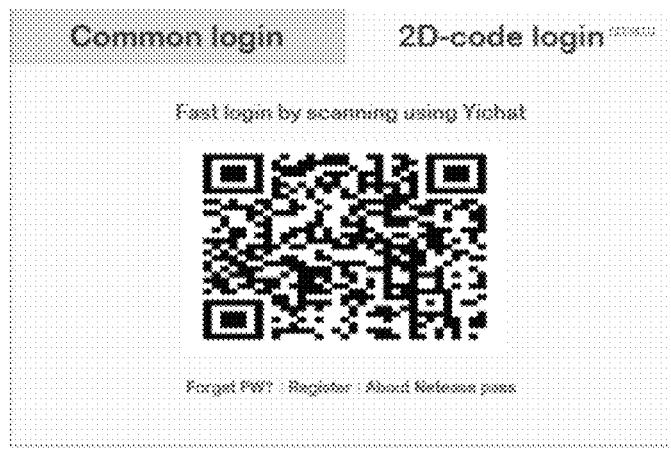
FIG. 4 schematically illustrates a schematic diagram of a 2-D code according to an embodiment of the invention.

S312: the first client displays the 2-D code. For example, the displayed 2-D code may be the 2-D code as shown in FIG. 4.

S320: the user performs image acquisition to the 2-D code displayed by the first client on a second client.

S321: the second client parses the acquired 2-D code to obtain a URL.

S322: the second client displays the URL in a page of an embedded browser.

S323: if the user clicks on the URL, the second client sends a connection request to the third party server where the URL points to, establishes a connection with the third party server, and sends an authentication request to the third party server.

S330: the third party server obtains an encrypted cookie in the embedded browser from the second client for the authentication request.

S331: if a valid cookie is obtained, the third party server obtains a user unique identifier and a login token of the user on the second client from the cookie.

S332: the third party server authenticates whether the login token is valid.

S333: if the login token is valid, it is determined that the login authentication is passed.

S334: if the login token is invalid, authenticate whether the user unique identifier is bound with third party account information, and authenticate whether the binding relationship is valid to enter step S336.

S335: if a valid cookie is not obtained, the third party server invokes a user information interface provided by a public platform corresponding to the second client to obtain the user unique identifier of the second client to enter step S336.

S336: the second client displays a third party account verification page (e.g., the third party account verification page as shown in FIG. 5) thereon to receive the third party account information—receiving user name information and password information in the case that the user unique identifier is not bound with the third party account information or the binding status is invalid; only receiving password information in the case that the user unique identifier is bound with the third party account information and the binding status is valid; and sends the third party account information to the third party server.

S340: the third party server performs login authentication to the third party account information.

S341: if the login authentication is passed, the third party server binds the user unique identifier with the third party account information to generate an encrypted cookie containing the user unique identifier and the login token, and the third party server sends the encrypted cookie to the second client to save the encrypted cookie in the embedded browser of the second client.

S342: the third party server sends a login authentication pass message to the second client, and the second client displays a login confirmation page (e.g., the login confirmation page as shown in FIG. 6) to the user, wherein information such as login location, login time, and login product of the current login of the user may be comprised in the page; if the user performs a login confirmation operation, the second client returns a message of the login confirmation operation of the user to the third party server.

S343: if the third party server receives the message of the login confirmation operation, it sends a message of entering into a page corresponding to a successful login to the first client.

S344: the first client performs page polling to obtain the message of entering into a page corresponding to a successful login through the page displayed when the third party server returns the 2-D code, and enters into the page of a successful login accordingly.

It can be seen that, by applying the method provided by the embodiment of the invention, the second client may be a client performing third party account login authentication with various third party platforms, i.e., a universal client, rather than a client for 2-D code login of a user on its own platform; therefore, the user may be enabled to perform 2-D code login for various platforms through a universal client without installing a lot of 2-D code login clients so as to save terminal resources. In addition, since the encrypted cookie in the embedded browser will be automatically removed after the user logs out from the second client, the security of the user information and third party account information on the second client may be guaranteed, thereby increasing the security of 2-D code login.

The First Exemplary Apparatus

Having presented a method of the exemplary embodiment of the invention, a login apparatus of the exemplary embodiment of the invention will then be described with reference to FIG. 7.

Figure 7:
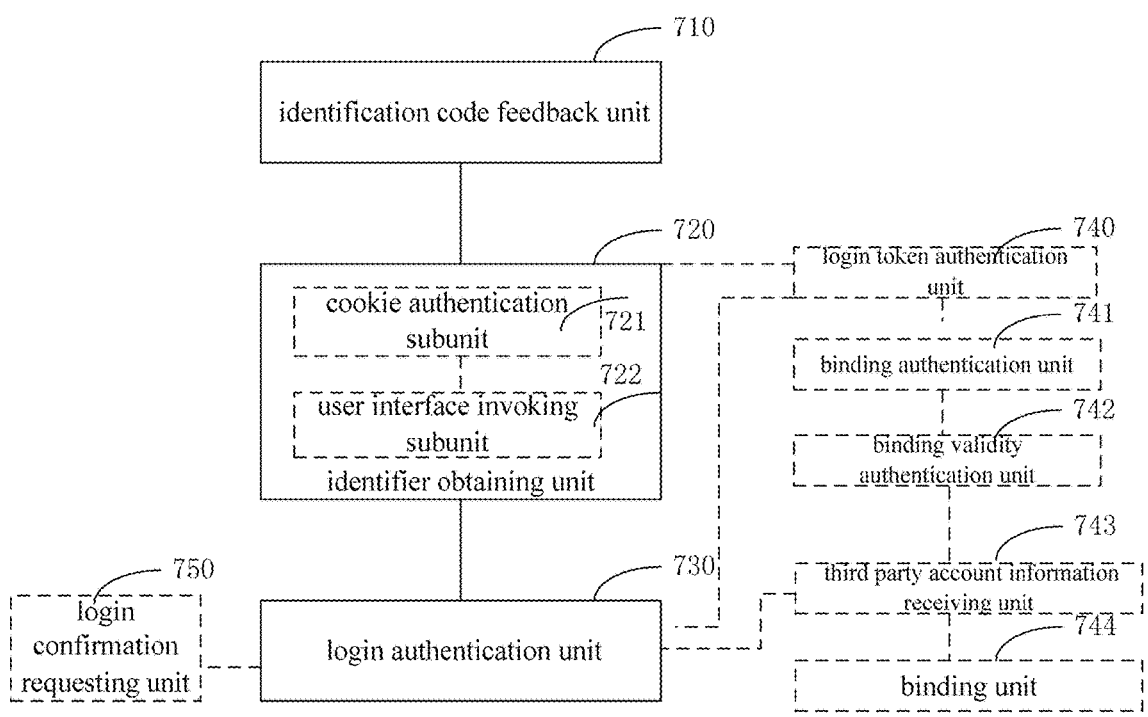
FIG. 7 schematically illustrates a structure diagram of a login apparatus configured on a third party server, according to an embodiment of the invention.

For example, referring to FIG. 7, there is shown a structure diagram of a login apparatus configured on a third party server provided by the embodiment of the invention. As shown, a possible embodiment of the examples of the invention may comprise:

An identification code feedback unit 710, which may be configured to, in response to receiving a login request sent by a user through a first client, return an identification code to the first client so as to display the identification code on the first client, wherein, the identification code contains address information of the third party server; an identifier obtaining unit 720, which may be configured to, in response to receiving an authentication request sent by a second client, obtain a user unique identifier of the second client, wherein, the authentication request is sent by the second client according to an address of the third party server after performing image acquisition to the identification code displayed on the first client and parsing the identification code to obtain the address information of the third party server; and a login authentication unit 730, which may be configured to perform login authentication to corresponding third party account information bound to the user unique identifier, and return a login authentication result to the first client.

According to some possible embodiments of the invention, as shown in FIG. 7, the identifier obtaining unit 720 may comprise: a cookie authentication subunit 721, which may be configured to authenticate whether a valid cookie containing the user unique identifier is obtained from the second client; and a user interface invoking subunit 722, which may be configured to, if a valid cookie containing the user unique identifier is not obtained from the second client, obtain the user unique identifier of the second client by invoking a user information interface provided by a public platform corresponding to the second client. It will be appreciated that the cookie containing the user unique identifier may be saved in an embedded browser of the second client. According to a session persistence mechanism, the embedded browser of the second client will always keep the cookie containing the user unique identifier during the time when the user is logged into the second client. Once the user is logged out from the second client, the cookie saved in the embedded browser is automatically deleted accordingly. Moreover, in the embodiment of encrypting the cookie by the third party server, there is no decryption algorithm for the encrypted cookie on the second client. Even if the second client is under malicious attack, the encrypted cookie will not be cracked, so that the security of the user information may be guaranteed.

According to some possible embodiments of the invention, the apparatus may further comprise the following authentication units: a login token authentication unit 740, which may be configured to authenticate whether a valid login token generated by the third party server is obtained from the second client; a binding authentication unit 741, which may be configured to, if a valid login token generated by the third party server is not obtained from the second client, authenticate whether the user unique identifier is bound with the corresponding third party account information; and a binding validity authentication unit 742, which may be configured to, if the user unique identifier is bound with the corresponding third party account information, authenticate whether the binding status of the binding between the user unique identifier and the third party account is valid.

Furthermore, in combination with the above embodiment, the login authentication unit 730 of the apparatus provided by the embodiment of the invention may be further configured to, if a valid login token generated by the third party server is obtained from the second client, determine that the login authentication to the corresponding third party account information bound to the user unique identifier is passed. A third party account information receiving unit 743 may also be comprised, which may be configured to, if a valid login token generated by the third party server is not obtained from the second client, receive third party account information input by the user through a third party account verification page displayed on the second client. A binding unit 744 may also be comprised, which may be configured to bind the user unique identifier of the second client with the third party account information. For example: if the user unique identifier is not bound with the corresponding third party account information, or if a valid login token generated by the third party server is not obtained from the second client and the binging status is authenticated as "invalid", the third party account information receiving unit 743 receives the third party account name and password input by the user through the third party account verification page displayed on the second client. For another example, if a valid login token generated by the third party server is not obtained from the second client and the binging status is authenticated as "valid", the third party account information receiving unit 743 receives only the third party account password input by the user through the third party account verification page displayed on the second client.

According to some possible embodiments of the invention, in order to prevent logging into an illegal platform by scanning an unknown 2-D code, the user may also be made to confirm the relevant information of the current login. Specifically, for example, the apparatus of the embodiment of the invention may further comprise: a login confirmation requesting unit 750, which may be configured to, if the login authentication to the third party account information by the login authentication unit is passed, return a login authentication pass message to the second client, for the second client to display a login confirmation page to the user. Wherein, the login authentication unit 730 may be configured to, if a login confirmation operation input by the user is received through the second client, cause the first client to enter into a page corresponding to a successful login.

It can be seen that, by configuring the apparatus provided by the embodiment of the invention on different third party servers, the address information of the third party server contained in the identification code returned by the identification code feedback unit 710 may be different, and the corresponding third party account information bound to the user unique identifier obtained by the identifier obtaining unit 720 may be different; hence, the user may install only one client for platforms of different web service providers to be able to login with the identity of the corresponding third party account on the different platforms by scanning the identification code displayed by other client on the client, thereby achieving the goal of saving terminal resources.

It should be noted that, the cookie authentication subunit 721, user interface invoking subunit 722, login token authentication unit 740, binding authentication unit 741, binding validity authentication unit 742, third party account information receiving unit 743, binding unit 744 and login confirmation requesting unit 750 are drawn with dashed lines in FIG. 7 to indicate that those units are not necessary units of the invention.

The Second Exemplary Method

A login method according to the exemplary embodiment of the invention will be described below with reference to FIG. 8, in connection with the application scenario in FIG. 1. It should be noted that, the above application scenario is shown merely to facilitate the understanding of the spirit and principles of the invention, and there is no limitation to the embodiments of the invention in this respect. On the contrary, the embodiments of the invention may be applicable to any suitable scenario.

Figure 8:
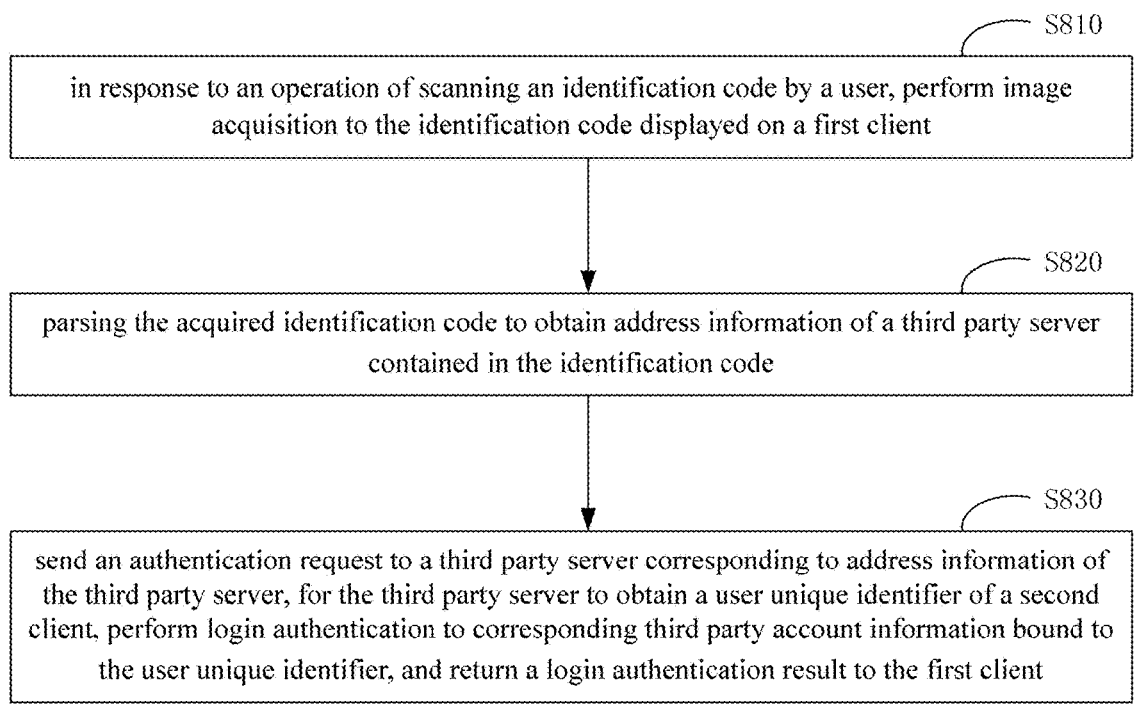
FIG. 8 schematically illustrates a flow diagram of a login method applied to a second client, according to an embodiment of the invention.

For example, referring to FIG. 8, there is shown a flow diagram of a login method applied to a second client provided by the embodiment of the invention. As shown, a possible embodiment of the invention may comprise:

S810: in response to an operation of scanning an identification code by a user, performing image acquisition to the identification code displayed on a first client;

S820: parsing the acquired identification code to obtain address information of a third party server contained in the identification code;

For example, after the user performs image acquisition to the identification code displayed by the first client on the second client, the second client may parse the identification code according to a decoding rule corresponding to the identification code to obtain the address information of the third party server contained in the identification code. Wherein, identification codes formed using different encoding schemes may correspond to different decoding rules.

Wherein, the address information of the third party server may be a URL of a webpage of the third party server for login authentication. For example, a page displayed by the webpage for login authentication may be the third party account verification page as shown in FIG. 5, or the login confirmation page as shown in FIG. 6; specifically, a corresponding page may be displayed according to the need of the actual authentication. For example, the second client may display a page where the URL points to in an embedded browser. The implementation of displaying the page where the URL points to on the second client is not limited. For example, in some possible embodiments, the URL may be displayed first, and when the user clicks on the URL, a connection request may be initiated to the third party server so as to establish a connection with the third party server and send an authentication request to obtain information of the page where the URL points to, and display the page where the URL points to in the embedded browser of the second client. For another example, in some other possible embodiments, the second client does not display the URL after the address information of the third party server is obtained by parsing, but directly initiates a connection request to the third party server according to the URL address so as to establish an connection with the third party server, send an authentication request, obtain information of the page where the URL points to, and display the page where the URL points to in the embedded browser of the second client.

S830: sending an authentication request to the third party server corresponding to the address information of the third party server, for the third party server to obtain a user unique identifier of the second client, perform login authentication to corresponding third party account information bound to the user unique identifier, and return a login authentication result to the first client.

According to some possible embodiments of the invention, the second client may return a cookie to the third party server, for the third party server to authenticate whether a valid cookie containing the user unique identifier is obtained from the second client. The cookie containing the user unique identifier may be saved in the embedded browser of the second client. According to a session persistence mechanism, the embedded browser of the second client will always keep the cookie containing the user unique identifier during the time when the user is logged into the second client. Once the user is logged out from the second client, the cookie saved in the embedded browser is automatically deleted accordingly. Moreover, in the embodiments of encrypting the cookie by the third party server, there is no decryption algorithm for the encrypted cookie on the second client. Even if the second client is under malicious attack, the encrypted cookie will not be cracked, so that the security of the user information may be guaranteed.

According to some possible embodiments of the invention, the second client may return a login token generated by the third party server to the third party server, for the third party server to authenticate whether a valid login token generated by the third party server is obtained from the second client; and, when a valid login token generated by the third party server is not obtained from the second client, authenticate whether the user unique identifier is bound with the corresponding third party account information; and, when the user unique identifier is bound with the corresponding third party account information, authenticate whether the binding status of the binding between the user unique identifier and the third party account is valid.

In combination with the above embodiments, if the third party server does not obtain a valid login token generated by the third party server from the second client, a third party account verification page may be displayed in the embedded browser of the second client, and third party account information input by the user may be received through the third party account verification page and sent to the third party server, for the third party server to bind the user unique identifier of the second client with the third party account information. More specifically, for example, if the third party server does not obtain a valid login token generated by the third party server from the second client and the binding status is authenticated as "valid", only third party account password input by the user may be received through the third party account verification page; if the third party server does not obtain a valid login token generated by the third party server from the second client and the binding status is authenticated as "invalid", third party account name and password input by the user may be received through the third party account verification page displayed on the second client.

According to some possible embodiments of the invention, it is also possible to, after the third party server performs login authentication to the third party account information bound to the user unique identifier, display a login confirmation page to the user in response to receiving a login authentication pass message returned by the third party server; if a login confirmation operation input by the user is received, return a message corresponding to the login confirmation operation to the third party server, for the third party server to cause the first client to enter into a page corresponding to a successful login.

It can be seen that, since the second client in the embodiments of the invention may be a client performing third party account login authentication with servers of various third party web service providers, i.e., a universal client, the user does not have to install a lot of clients to achieve login of corresponding servers by 2-D code scanning, thereby achieving the goal of saving terminal resources.

The Second Exemplary Apparatus

Having presented a method of the exemplary embodiment of the invention, a login apparatus of the exemplary embodiment of the invention will then be described with reference to FIG. 9.

Figure 9:
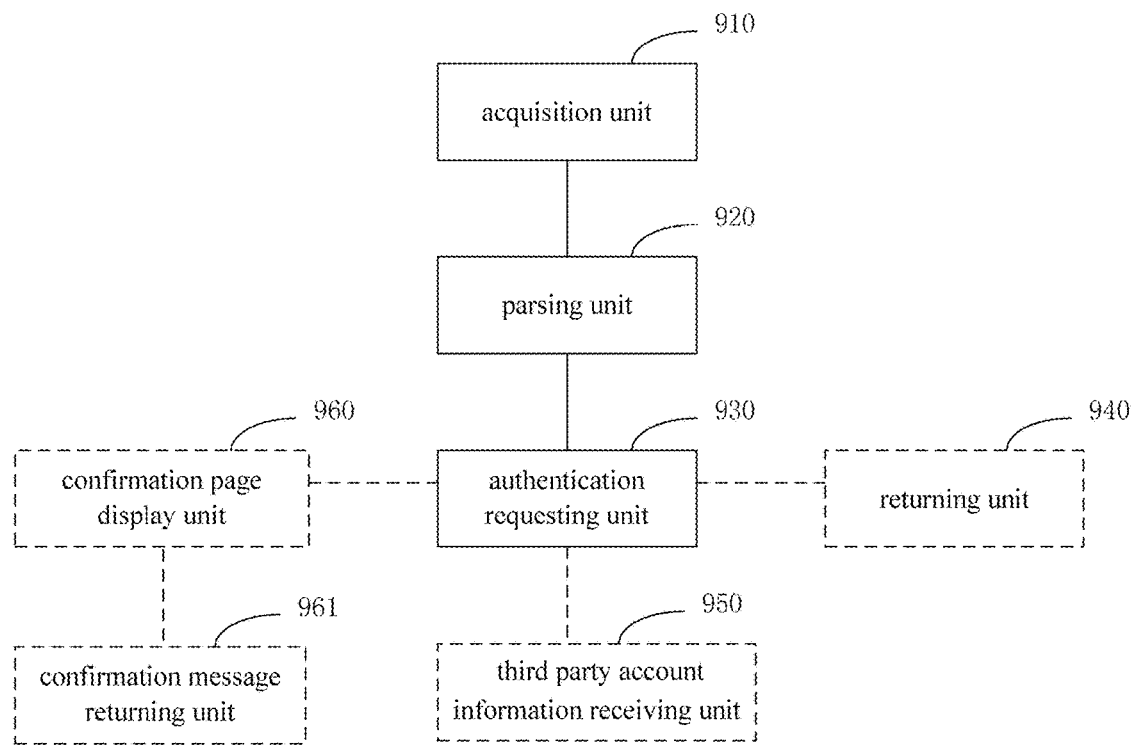
FIG. 9 schematically illustrates a structure diagram of a login apparatus configured on a second client, according to an embodiment of the invention.

For example, referring to FIG. 9, there is shown a structure diagram of a login apparatus configured on a second client provided by the embodiment of the invention. As shown, a possible embodiment of the invention may comprise: an acquisition unit 910, which may be configured to, in response to an operation of scanning an identification code by a user, perform image acquisition to the identification code displayed on a first client; a parsing unit 920, which may be configured to parse the acquired identification code to obtain address information of a third party server contained in the identification code; and an authentication requesting unit 930, which may be configured to send an authentication request to the third party server corresponding to the address information of the third party server, for the third party server to obtain a user unique identifier of the second client, perform login authentication to corresponding third party account information bound to the user unique identifier, and return a login authentication result to the first client.

According to some possible embodiments of the invention, the apparatus may further comprise a returning unit 940 configured to return a cookie to the third party server, for the third party server to authenticate whether a valid cookie containing the user unique identifier is obtained from the second client.

According to some possible embodiments of the invention, the returning unit 940 may also be used to return a login token generated by the third party server to the third party server, for the third party server to authentication whether a valid login token generated by the third party server is obtained from the second client, and, when a valid login token generated by the third party server is not obtained from the second client, authenticate whether the user unique identifier is bound with the corresponding third party account information; and, when the user unique identifier is bound with the corresponding third party account information, authenticate whether the binding status of the binding between the user unique identifier and the third party account is valid.

In combination with the above embodiments, the apparatus may further comprise a third party account information receiving unit 950, which may be configured to, if the third party server does not obtain a valid login token generated by the third party server from the second client, receive third party account information input by the user through a third party account verification page displayed on the second client, and send the third party account information to the third party server, for the third party server to bind the user unique identifier of the second client with the third party account information. More specifically, for example, if the third party server does not obtain a valid login token generated by the third party server from the second client and the binding status is authenticated as "valid", the third party account information receiving unit 950 may receive only a third party account password input by the user through the third party account verification page. If the third party server does not obtain a valid login token generated by the third party server from the second client and the binding status is authenticated as "invalid", the third party account information receiving unit 950 may receive a third party account name and password input by the user through the third party account verification page displayed on the second client.

According to some possible embodiments of the invention, the apparatus may further comprise: a confirmation page display unit 960, which may be configured to, in response to receiving a login authentication pass message returned by the third party server, display a login confirmation page to the user; and a confirmation message returning unit 961, which may be configured to, if a login confirmation operation input by the user is received, return a message corresponding to the login confirmation operation to the third party server, for the third party server to cause the first client to enter into a page corresponding to a successful login.

It should be noted that, the returning unit 940, third party account information receiving unit 950, confirmation page display unit 960 and confirmation message returning unit 961 are drawn with dashed lines in FIG. 9 to indicate that those units are not necessary units of the invention.

It should be noted that, although a number of units or subunits of the login apparatus have been set forth in the above detailed description, such division is non-mandatory. In fact, the features and functionalities of two or more of the units described above may be embodied in a single unit, in accordance with the embodiments of the invention. Conversely, the features and functionalities of a single unit describe above may be further divided to be embodied by a plurality of units.

Moreover, although the operations of the method of the present invention have been described in a specific order in the drawings, this does not require or imply that those operations are necessarily performed in such specific order, or that all of the illustrated operations have to be performed to achieve desired results. Additionally or alternatively, certain steps may be omitted, a plurality of steps may be combined and performed in a single step, and/or a single step may be broken up into and performed in a plurality of steps.

Although the spirit and principles of the present invention have been described with reference to a number of specific embodiments, it should be understood that the present invention is not limited to the disclosed specific embodiments, and the division of various aspects does not mean that features in those aspects cannot be combined to benefit, and such division is merely for the convenience of presentation. The present invention is intended to cover various modifications and equivalent arrangements within the spirit and scope of the appended claims.

What is claimed is:

1. A login method, comprising:
in response to receiving a login request sent by a user through a first client, returning, by a third party server, an identification code to the first client so as to display the identification code on the first client, wherein, the identification code contains address information of the third party server;
in response to receiving an authentication request sent by a second client, obtaining, by the third party server, a user unique identifier of the second client, wherein, the authentication request is sent by the second client according to an address of the third party server after performing image acquisition to the identification code displayed on the first client and parsing the identification code to obtain the address information of the third party server, wherein the user unique identifier is bound to corresponding third party account information; and
performing, by the third party server, login authentication to the corresponding third party account information bound to the user unique identifier, and returning a login authentication result to the first client,
wherein different address information of the third party server contained in the identification code corresponds to different third party account information bound to the user unique identifier of the second client, wherein the obtaining the user unique identifier of the second client by the third party server comprises:
authenticating, by the third party server, whether a valid cookie containing the user unique identifier is obtained from the second client; and
when a valid cookie containing the user unique identifier is not obtained from the second client, obtaining, by the third party server, the user unique identifier of the second client by invoking a user information interface provided by a public platform corresponding to the second client, and
wherein the first client is a web browser running on a terminal, and the second client is an instant messaging client application running on another smart mobile terminal.

2. The login method according to claim 1, wherein, before performing login authentication to the corresponding third party account information bound to the user unique identifier, the method further comprises the following authentication steps:
authenticating, by the third party server, whether a valid login token generated by the third party server is obtained from the second client;
when a valid login token generated by the third party server is not obtained from the second client, authenticating, by the third party server, whether the user unique identifier is bound with the corresponding third party account information; and
when the user unique identifier is bound with the corresponding third party account information, authenticating, by the third party server, whether the binding status of the binding between the user unique identifier and the third party account is valid.

3. The login method according to claim 2, further comprising:
when the valid login token generated by the third party server is obtained from the second client, determining, by the third party server, that the login authentication to the corresponding third party account information bound to the user unique identifier is passed; and
when the valid login token generated by the third party server is not obtained from the second client, receiving, by the third party server, third party account information input by the user through a third party account verification page displayed on the second client.

4. The login method according to claim 1, wherein, after performing login authentication to the third party account information bound to the user unique identifier, the method further comprises:
when the login authentication to the third party account information is passed, returning, by the third party server, a login authentication pass message to the second client, for the second client to display a login confirmation page to the user; and
receiving, by the third party server, a login confirmation operation input by the user through the second client to cause the first client to enter into a page corresponding to a successful login.

5. A login apparatus configured on a third party server, comprising:
a processor; and a memory storing processor-executable program instructions, that when executed, configure the processor to:
in response to receiving a login request sent by a user through a first client, return an identification code to the first client so as to display the identification code on the first client, wherein the identification code contains address information of the third party server;
in response to receiving an authentication request send by a second client, obtain a user unique identifier of the second client, wherein the authentication request is sent by the second client according to an address of the third party server after performing image acquisition to the identification code displayed on the first client and parsing the identification code to obtain the address information of the third party server, wherein the user unique identifier is bound to corresponding third party account information; and
perform login authentication to corresponding third party account information bound to the user unique identifier, and return a login authentication result to the first client,
wherein different address information of the third party server contained in the identification code corresponds to different third party account information bound to the user unique identifier of the second client,
wherein the obtaining a user unique identifier of the second client comprises:
authenticating whether a valid cookie containing the user unique identifier is obtained from the second client; and
when a valid cookie containing the user unique identifier is not obtained from the second client, obtaining the user unique identifier of the second client by invoking a user information interface provided by a public platform corresponding to the second client, and
wherein the first client is a web browser running on a terminal, and the second client is an instant messaging client application running on another smart mobile terminal.

6. The login apparatus according to claim 5, wherein, before performing login authentication to the corresponding third party account information bound to the user unique identifier, the processor is further configured to:
authenticate whether a valid login token generated by the third party server is obtained from the second client;
when the valid login token generated by the third party server is not obtained from the second client, authenticate whether the user unique identifier is bound with the corresponding third party account information; and
when the user unique identifier is bound with the corresponding third party account information, authenticate whether the biding status of the binding between the user unique identifier and the third party account is valid.

7. The login apparatus according to claim 6, wherein the processor is further configured to:
when the valid login token generated by the third party server is obtained from the second client, determine that the login authentication to the corresponding third party account information bound to the user unique identifier is passed; and
when the valid login token generated by the third party server is obtained from the second client, receive third party account information input by the user through a third party account verification page displayed on the second client.

8. The login apparatus according to claim 5, wherein, after performing login authentication to the third party account information bound to the user unique identifier, the processor is further configured to:

when the login authentication to the third party account information by the login authentication unit is passed, return a login authentication pass message to the second client, for the second client to display a login confirmation page to the user; and when a login confirmation operation input by the user is received through the second client, cause the first client to enter into a page corresponding to a successful login.

* * * * *